(12) United States Patent
Little, Jr.

(10) Patent No.: US 6,582,184 B2
(45) Date of Patent: Jun. 24, 2003

(54) TURBINE CONTROLS TESTING DEVICE

(75) Inventor: Jack R. Little, Jr., Baton Rouge, LA (US)

(73) Assignee: ILD, Inc., Baton Rouge, LA (US)

( * ) Notice: Subject to any disclaimer, the term of this patent is extended or adjusted under 35 U.S.C. 154(b) by 83 days.

(21) Appl. No.: 09/907,138

(22) Filed: Jul. 17, 2001

(65) Prior Publication Data

US 2003/0017046 A1 Jan. 23, 2003

(51) Int. Cl.[7] ............................................... F01D 21/02
(52) U.S. Cl. ............................ 415/1; 415/118; 415/123
(58) Field of Search ........................... 415/1, 118, 123; 416/170 R, 61

(56) References Cited

U.S. PATENT DOCUMENTS

| | | | |
|---|---|---|---|
| 2,617,253 A | 11/1952 | Fusner et al. | 60/39.09 |
| 3,682,564 A | 8/1972 | Feeney | 415/16 |
| 4,003,200 A * | 1/1977 | Zerlauth | 60/39.02 |
| 4,211,070 A * | 7/1980 | Portmann | 60/39.08 |
| 4,249,371 A | 2/1981 | Romeyke | 60/39.04 |
| 4,266,422 A | 5/1981 | Ullinger | 73/2 |
| 5,133,189 A | 7/1992 | Hurley | 60/646 |
| 5,292,225 A | 3/1994 | Dyer | 415/29 |

* cited by examiner

Primary Examiner—Ninh H. Nguyen
(74) Attorney, Agent, or Firm—André J. Porter; John H. Runnels; Bonnie J. Davis

(57) ABSTRACT

A turbine controls testing device is disclosed that can be adapted to test the control systems of most turbine rotors without the use of steam. The turbine controls testing device comprises an operator control system, a drive motive power assembly and a purge gas assembly. The novel device controllably spins, accelerates, and decelerates a turbine with a relatively high level of precision, minimizing the likelihood that, in the event an overspeed mechanism malfunction occurs, the turbine will be damaged as a result of sonic velocity or any other mechanical failure.

14 Claims, 1 Drawing Sheet

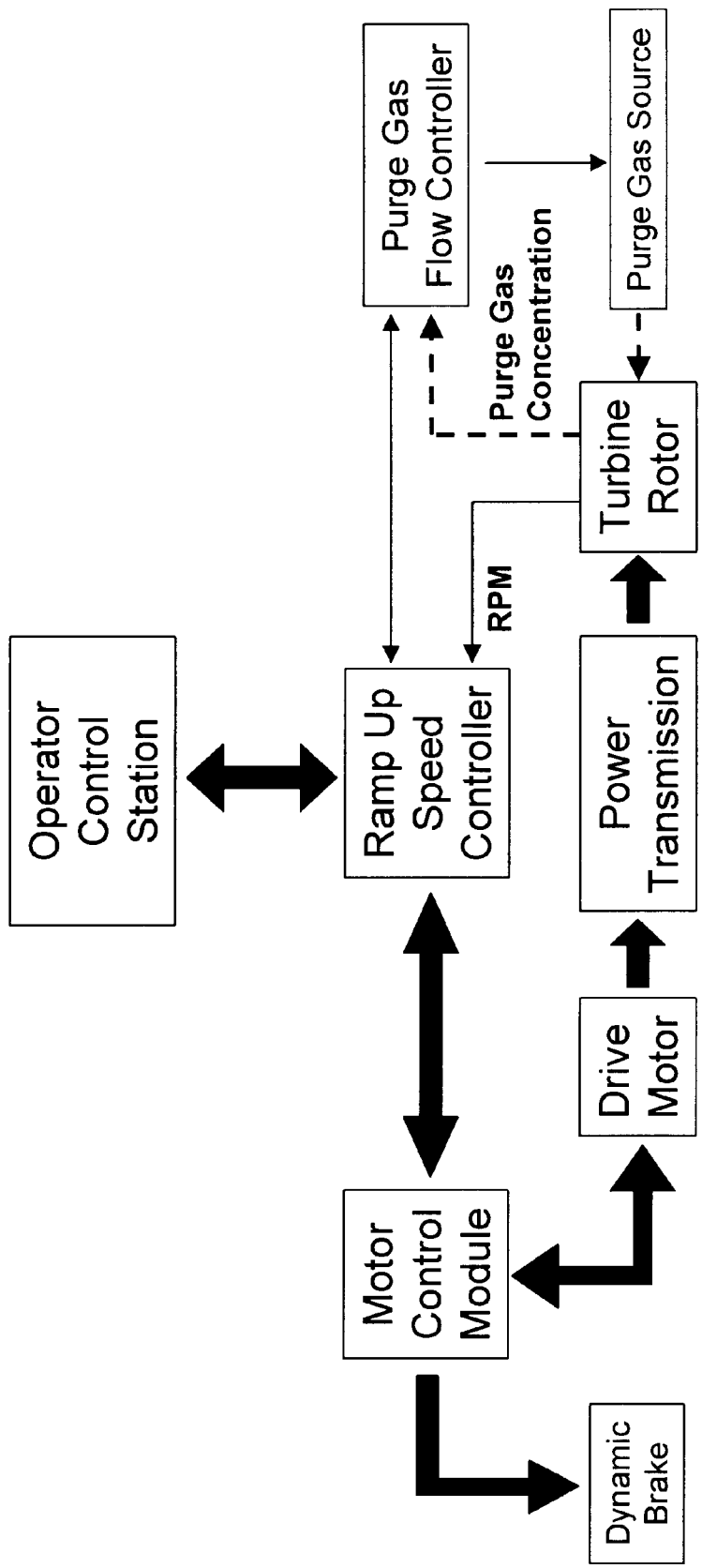
Figure

TURBINE CONTROLS TESTING DEVICE

This invention pertains to turbines, more specifically to the testing of turbine control systems, such as overspeed prevention systems.

Turbine machines, especially steam turbines used in commercial power plants, generally employ control systems that perform a variety of functions, including tripping. "Tripping" is the shutting down of a turbine when certain abnormal situations occur, for example, low bearing oil pressure, high bearing temperature, and rotor overspeed. Rotor overspeed, if unchecked, could cause a rotor to fly apart, resulting in substantial damage, and in some instances, catastrophic results. Consequently, most steam turbines are equipped with either electric or hydraulic control systems or both, and backup mechanical overspeed trip devices to prevent rotor overspeed. These devices must be periodically tested to ensure proper functioning. In most instances, testing turbine overspeed trip systems requires driving the turbine rotor to trip set-points, typically set at 103–120% of the normal design speed. See, e.g., U.S. Pat. Nos. 5,133,189 and 5,292,225.

In nuclear power plants, small to medium power turbines are routinely used as prime movers (source of rotation), and are periodically tested to ensure proper functioning. Generally, less risk is involved when overspeed trip testing is performed at a time when the turbine is not required to be operational, for example, during refueling outages. During refueling outages, maintenance and testing activities which, if delayed, would delay the return to service (productivity) of the power plant are identified as being "on critical-path." By contrast, maintenance and testing activities performed during an outage that do not increase the outage duration are identified as "off critical-path." Nuclear power plant management typically prefers that all maintenance and testing activities, including overspeed testing, be performed off critical-path where possible. However, the costs associated with conducting these tests can be significant because an alternate source of steam has typically been required to spin the turbine since the reactor can no longer produce steam. These costs can include the rental of an alternative steam source capable of spinning the turbine rotor beyond its normal trip set-points, in addition to manpower costs for engineering, maintenance, and operations support. Furthermore, the logistics of installation, operation, and removal of the required equipment can add complexity to an already complex refueling outage schedule.

Alternatively, overspeed trip testing could be conducted using steam provided by the reactor once it is again operational. However, this testing method is generally not preferred because of the losses in productivity that result due to the delay in return to service. More specifically, when testing a turbine using steam provided by the reactor, the tests are performed during the plant start-up from the refueling outage. This testing method is generally considered "on critical-path" because the testing activity becomes a series activity in the start-up sequence.

To rotate a turbine rotor beyond normal trip set-points requires high power motive drive systems, capable of overcoming windage effects. "Windage" generally refers to a loss due to fluid drag on a rotating body. Windage losses are a function of the speed of a turbine rotor. Windage effects for rotors spinning in air at high speeds are significant.

An unfilled need exists for a device to test turbine control systems that reduces the power requirement needed to spin the turbine rotor beyond its normal trip set-points during overspeed testing, and that allows overspeed testing to be performed off critical-path. This device should allow testing without subjecting the tested turbine to unacceptable stresses, such as near-sonic velocity at the turbine rotor tips.

I have discovered a reliable and inexpensive device and method for testing turbine control systems. The device may be adapted to test most turbine rotors. The turbine control testing device comprises an operator control system, a drive motive power assembly, and a purge gas assembly. Once installed, the testing device is used to accelerate the turbine rotor to its test velocity without the use of steam. Rotor speed and acceleration may be controlled with relatively high precision. This minimizes the likelihood that the turbine will be damaged as a result of sonic velocity or other mechanical failure. The purge gas assembly provides a purge gas whose sonic velocity is higher than that of air, thereby reducing sonic velocity risks. Windage losses and power requirements are both minimized by selecting a purge gas with a low atomic/molecular weight.

BRIEF DESCRIPTION OF THE DRAWING

The FIGURE illustrates schematically a block diagram of the major components of one embodiment of the turbine controls testing device.

In one embodiment, this invention provides a means for fast, off critical-path testing of turbine overspeed trip systems. The basic design comprises an operator control system, a drive motive power assembly, and a purge gas assembly. In one embodiment, the turbine controls testing device provides a self-contained testing system that provides a means for driving the turbine while monitoring and controlling its rotation speed. In practice, the turbine being tested is isolated from drive steam and the other components to which it is usually attached (e.g., pumps, generators, etc.). Air in the turbine rotor casing is replaced with a purge gas capable of reducing windage while increasing sonic velocity within the turbine rotor casing. A preferred purge gas is helium.

There are several advantages to testing overspeed trip systems using this device. First, costs and down-time may be reduced. This device may be a self-contained testing system, eliminating the costs associated with the use of an alternate source of steam to rotate the turbine (e.g., renting a steam source, providing manpower, providing operations support and installation and removal of the steam source). Second, the purge gas reduces windage. The power required to spin the turbine rotor is reduced, enabling the invention to be used on large turbines and in limited spaces that would preclude the use of many other available alternative testing apparatuses. Finally, the purge gas increases sonic velocity, and thus minimizes risks associated with the turbine wheel tip approaching or exceeding sonic speed during testing.

The FIGURE illustrates schematically a block diagram of the major components of one embodiment of the turbine controls testing device. This embodiment comprises an operator control system, a drive motive power assembly, and a purge gas assembly. The operator control system comprises a programmable logic controller ("PLC") and an operator control station ("OCS"). The PLC monitors and controls all testing functions. However, actual operator control is accomplished through the OCS, which allows an operator to monitor and direct the testing process. The entire test process is preferably programmed into the PLC prior to actual testing. The operator initiates start-up, and the PLC monitors and controls all other functions, including purge gas flow control, drive motor speed, acceleration, and start and stop functions.

In the embodiment illustrated in the FIGURE, the drive motive power assembly comprises a drive motor, a variable speed drive, a dynamic brake, a motor control module and a power transmission. The drive motive power assembly provides controlled drive sufficient to accelerate an uncoupled turbine rotor to the desired test speed. The drive motor functions as the sole source of driving power. Several factors are considered when choosing a drive motor, including power rating, physical size, torque output, drive ratio, and operating voltage.

The drive motor in this embodiment is an alternating current induction motor sized to fit within a given operating space. In an alternative embodiment, the drive motor can be a direct current motor or an internal combustion engine. The drive motor and power transmission have a drive ratio (ratio of motor speed to the turbine rotor speed) and power sufficient to allow the drive motor to controllably spin the turbine rotor to the test speed.

The variable speed drive (not shown) assists the drive motor by providing a means of electronically controlling the drive motor speed. In operation, the variable speed drive gradually increases power to the drive motor until the power is sufficient to accelerate the drive motor to its test speed.

In a preferred embodiment, the variable speed drive controls speed by varying the electrical frequency (when using an alternating current induction drive motor) entering the drive motor, which in turn changes the speed of the drive motor. A ramp-up speed controller, an integral component of the variable speed drive, assists the control of acceleration, deceleration, and speed of the drive motor during testing.

The dynamic brake also assists the drive motor in providing controlled drive. The dynamic brake can be an integral or a separate component of the variable speed drive. The dynamic brake should sufficiently dissipate kinetic energy of the spinning rotor to allow precise speed control during deceleration of the turbine rotor. The motor control module coordinates the functioning of the variable speed drive, which in turn controls the drive motor. The variable speed drive monitors the drive motor output and can increase output speed by increasing frequency and power to the drive motor. Additionally, the variable speed drive can decrease output by reducing frequency and power to the turbine rotor, or by activating the dynamic brake to decrease the drive motor rotation speed. The power transmission functions as a power converter. The power transmission is preferably sized to fit within the space between the induction motor and the turbine. The power transmission is geared to accept the power provided by the drive motor, convert the power to torque, and spin the turbine rotor at an adequate, predetermined speed. In a preferred embodiment, a transfer case is used together with the power transmission to form a drive system that transfers power supplied by the drive motor to the turbine rotor (not shown). The transfer case is sized to fit in the space normally occupied by a drive coupling spacer, which is used as a linkage between the turbine and the pump or other device being driven.

The components of the drive motive power assembly complement one another. Operating as one unit, the drive motive power assembly provides sufficient controlled drive to accelerate an uncoupled turbine rotor to the test speed. In a preferred embodiment, the drive motive power assembly is configured to have only sufficient power to provide enough controlled drive to accelerate the uncoupled turbine rotor to test speed when the turbine rotor is encased in an environment with a sufficient amount of purge gas. This configuration prevents acceleration to sonic velocity should purge gas assembly failure occur during turbine testing.

In the embodiment shown in the FIGURE, the purge gas assembly comprises a purge gas source, a purge gas detector, and a purge gas flow controller. The purge gas replaces the air or steam in which the turbine rotor otherwise moves, so that windage losses are minimized, while the speed of sound is increased relative to that of air. Purging the turbine rotor casing with an appropriate purge gas helps ensure that turbine rotor-tip speed does not approach the speed of sound, even in the event that the rotor substantially exceeds the test speed. The purge gas should preferably have the following properties: low molecular weight, low chemical reactivity, and high sonic velocity. A preferred purge gas is helium. Helium has a molecular weight of 4.0, sonic velocity of about 4000 ft/sec, and essentially zero chemical reactivity. By contrast, air has an effective molecular weight of approximately 28.0 and a relatively high capability of oxidizing turbine operating components, especially should the temperature of the operating components exceed operating temperatures. Other room-temperature gases with lower molecular weights than air include, for example, hydrogen, neon, argon, methane, hydrogen fluoride, and ammonia. As a practical matter, helium is believed to be superior to each of these other gases, due to the other gases' higher corrosiveness, flammability, or cost.

The power required to accelerate a spinning mass to a predetermined spin rate is the sum of the acceleration load and the windage load. Acceleration load is a function of the mass and the geometry of the spinning turbine rotor. Thus, the power required to accelerate the turbine rotor to test speed due to the acceleration load will remain constant because the mass and geometry of the turbine rotor remain constant. Windage load is a function of the average mass and density of the particles "moved out of the way" by the spinning rotor. As a result, windage load is a function of gas pressure and density. Accordingly, substituting a low molecular weight gas, such as helium, for air in the turbine rotor casing reduces the windage load by a factor of about 7.0 (i.e., by 85%). At overspeed, the windage load due to air can represent up to 80% or more of the total load. A purge gas such as helium could reduce the total load by approximately 68% during overspeed testing, provided additional shaft loads, for example lubricating oil pumps, are small or absent.

Another important property of the purge gas is that it should provide a high sonic velocity (speed of sound). For example, the speed of sound in dry air at atmospheric pressure is about 1100 ft/sec, compared to about 4000 ft/sec for helium. Purging the turbine rotor casing with a purge gas, such as helium, ensures that a satisfactory margin to sonic velocity is maintained, even in the event that velocity of the turbine rotor extends significantly beyond the nominal overspeed trip set-point. For example, if a turbine has a rotor diameter of 36 inches and an overspeed trip set-point of approximately 5100 rpm, the wheel tip at overspeed will be moving at approximately 800 ft/sec. Keeping in mind that it may be necessary to spin the turbine rotor beyond the overspeed trip set-point, the margin to sonic velocity in dry air will be less than 300 ft/sec. However, if the same turbine rotor is spun in helium, the margin to sonic velocity will be approximately 10 times higher.

The flow of purge gas is controlled by the purge gas flow controller. The purge gas flow controller admits purge gas at a rate sufficient to generate and maintain a purge gas concentration of essentially 100% in the turbine rotor casing, while preventing the creation of a significant positive pressure (excessive pressure) on the turbine rotor casing. (Note that a significant amount of positive pressure could lead to excessive purge gas consumption and additional windage loss.) Purge gas is admitted into the turbine rotor casing via a pressure regulating device until its presence is verified at the turbine pump-end shaft seal by a gas detection sensor (e.g., a thermal conductivity sensor and balanced bridge detector, or other detector known in the art), which sends a signal to the PLC for purge gas flow control.

Low pressure purge gas is delivered to the turbine rotor casing under control of the PLC at a volume flow rate sufficient to fill the turbine rotor casing completely with purge gas.

A prototype of this embodiment is currently being fabricated in Baton Rouge, La. and will be tested at Hatch Nuclear Power Plant in Vidalia, Ga. The turbine under test will be a Terry, Model CCS dual wheel drive turbine (Dresser-Rand Company, Olean N.Y.). This turbine has a rotor diameter of 36 inches and an overspeed trip set-point of approximately 5100 rpm. The wheel tip speed is approximately 800 ft/sec at the overspeed trip set-point.

Once the turbine controls testing device has been set up, a typical operation sequence is as follows: (1) The operation specifications of the turbine (e.g., the rotor diameter, overspeed trip set-point, wheel tip speed, etc.) are input to the PLC or variable speed driver. (2) One or more purge gas flow control valves are opened by the purge gas controller. Purge gas flows from a gas storage cylinder through a pressure regulator and into the turbine rotor casing. When the purge gas detector indicates that a predetermined concentration level of purge gas has been reached, the PLC regulates the flow, admitting just enough purge gas to maintain a concentration of essentially 100%. (3) The PLC signals the motor control module to apply power to the turbine motor once it is determined that a sufficient concentration of purge gas is within the turbine rotor casing. During operation, if the PLC detects a purge gas concentration level below a pre-determined minimum, it will increase the flow until a sufficient purge gas concentration is restored. However, if the concentration continues to fall (i.e., due to a malfunction, a depletion of available purge gas, etc.) the PLC automatically sends a stop command to the variable speed drive, which then decelerates the turbine to a stop, preventing damage to the turbine and allowing the operator to trouble-shoot the malfunction. In a preferred embodiment, as an added safety feature, if an adequate amount of purge gas concentration is not present, the drive motive power assembly will not have sufficient power to continue spinning the rotor, and thus will shut down the testing procedure.

EXAMPLE 1

Experiments were conducted to test power requirements in air and helium. A four blade fan, approximately 36 inches in diameter, was used to simulate the windage characteristics of a turbine. The test results are shown in Table 1. The fan was fully enclosed in a wooden crate having an inside volume of approximately 27.55 ft$^3$, and all edges were sealed with silicone to prevent leakage. A Toshiba G3 Model 4160 15 hp variable speed drive (Toshiba International Corporation, Houston, Tex.), and a Dayton 1 hp, 1725 rpm motor (Emerson Electric, St. Louis, Mo.) were used to spin the fan in air. Rotation speed was increased by increasing frequency at 5 Hz intervals, up to 45 Hz. Output current and voltage were recorded from the variable speed drive at each frequency. (Maximum rotation speed in air was achieved at a frequency of 45 Hz due to the power output limitations of the 1 hp motor.) This same procedure was followed to spin the fan in helium, using a helium tank to input the helium into the low-pressure side of the fan. The current and voltage were recorded at 5 Hz intervals up to 60 Hz. (The frequency was increased to 60 Hz, increasing the rotation speed beyond the speed achieved in air due to the reduced windage effects of helium.) The motor was also run with no load, and voltage and current were recorded at 5 Hz intervals up to 60 Hz. Each set of data for air and helium was normalized by subtracting the "no load" power at each speed.

TABLE 1

| Power Frequency (Hz) | Load (RPM) | No Load (Hp) | Air (Hp) | Normalized Air (Hp) | Helium (Hp) | Normalized Helium (Hp) | Air v. Helium (Ratio of Hp) |
|---|---|---|---|---|---|---|---|
| 5 | 57.5 | 0.083 | 0.077 | −0.006 | 0.078 | −0.005 | |
| 10 | 115.0 | 0.163 | 0.154 | −0.009 | 0.145 | −0.018 | |
| 15 | 172.5 | 0.240 | 0.225 | −0.015 | 0.212 | −0.029 | |
| 20 | 230.0 | 0.335 | 0.334 | −0.001 | 0.298 | −0.037 | |
| 25 | 287.5 | 0.395 | 0.436 | 0.042 | 0.371 | −0.024 | |
| 30 | 345.0 | 0.472 | 0.575 | 0.102 | 0.470 | −0.002 | |
| 35 | 402.5 | 0.550 | 0.791 | 0.241 | 0.547 | −0.002 | |
| 40 | 460.0 | 0.627 | 1.041 | 0.414 | 0.625 | −0.002 | |
| 45 | 517.5 | 0.706 | 1.404 | 0.698 | 0.746 | 0.039 | 17.787 |
| 50 | 575.0 | 0.782 | | *1.027 | 0.851 | 0.069 | 14.781 |
| 55 | 632.5 | 0.861 | | *1.429 | 1.024 | 0.163 | 8.788 |
| 60 | 690.0 | 0.938 | | *1.900 | 1.147 | 0.208 | 9.113 |

*Data values estimated from a curve fit, by method of least squares. Insufficient power was available to spin test the device in air at speeds higher than 517 RPM.

Helium substantially reduced the windage effects associated with the spinning masses (rotors) at high speeds. As shown in Table 1, the ratio of normalized horsepower required to spin the fan in air was approximately 9 times higher than the normalized horsepower required to spin the fan in helium at 690 rpm, but as the data was extrapolated out, the value asymptotically approached 7. (Ratio of normalized horsepower is 9±2, which encompasses the anticipated theoretical value of approximately 7, obtained from the ratio of molecular weights.)

While the above specification describes one embodiment of the invention used to test turbine overspeed systems, various embodiments can be adapted from this basic design for tasks including maintenance and troubleshooting in virtually any turbo machine by making a few modifications, including changing the layout or size of the functional components, changing the PLC or variable speed drive program, or switching drive motors.

The complete disclosures of all references cited in this specification are hereby incorporated by reference. In the event of an otherwise irreconcilable conflict, however, the present specification shall control.

I claim:

1. A device for spinning a turbine rotor in a turbine rotor casing, comprising:
   (a) a drive motive assembly capable of providing sufficient torque and power to the turbine rotor to spin the turbine rotor at a desired angular velocity;
   (b) a purge gas source comprising a quantity of a purge gas; wherein the purge gas is not steam; and wherein the purge gas consists essentially of one or more gases having a molecular weight less than 28; and
   (c) a purge gas assembly adapted to supply the purge gas from the purge gas source to the rotor casing at a rate sufficient that the gas inside the rotor casing consists essentially of the purge gas; whereby the sonic velocity inside the rotor casing is higher than the sonic velocity of air at the same temperature and pressure; and whereby windage loss due to the spinning of the turbine rotor is less than the windage loss would be in air at the same temperature, pressure, and turbine rotor angular velocity within the turbine rotor casing.

2. A device as recited in claim 1, additionally comprising an operator control system that monitors and controls said drive motive assembly and said purge gas assembly.

3. A device as recited in claim 2, wherein said operator control system comprises software to allow said device to test the proper functioning of a turbine control system.

4. A device as recited in claim 2, wherein said operator control system comprises software to allow said device to test the proper functioning of a turbine overspeed trip system.

5. A device as recited in claim 1, wherein said drive motive assembly comprises a drive motor, a variable speed drive, a dynamic brake, a motor control module and a power transmission.

6. A device as recited in claim 1, wherein the purge gas source comprises a quantity of a purge gas selected from the group consisting of helium, hydrogen, neon, argon, methane, hydrogen fluoride, and ammonia.

7. A device as recited in claim 1, wherein the purge gas source comprises a quantity of helium.

8. A method for increasing sonic velocity and reducing windage on a turbine rotor spinning inside a turbine rotor casing, said method comprising the steps of:
   (a) supplying the turbine rotor casing with a purge gas; wherein the purge gas is not steam; and wherein the purge gas consists essentially of one or more gases having a molecular weight less than 28;
   (b) purging the turbine rotor casing with the purge gas by supplying the purge gas to the turbine rotor casing at a rate sufficient that the gas inside the turbine rotor casing consists essentially of the purge gas; and
   (c) spinning the rotor inside the turbine rotor casing.

9. A method as recited in claim 8, further comprising testing the proper functioning of a turbine control system that controls the spinning of the turbine rotor.

10. A method as recited in claim 8, additionally comprising the steps of:
   (a) inputting desired operational specifications of the turbine rotor into an operator control system;
   (b) supplying the purge gas through one or more purge gas flow control line solenoid valves controlled by a programmable logic controller;
   (c) monitoring and controlling the concentration of the purge gas in the turbine rotor casing with a programmable logic controller; and
   (d) spinning the rotor to a predetermined speed.

11. A method as recited in claim 8, wherein the purge gas is selected from the group consisting of helium, hydrogen, neon, methane, argon, hydrogen fluoride, and ammonia.

12. A method as recited in claim 8, wherein the purge gas source comprises helium.

13. A method as recited in claim 8, wherein the rotor rotation speed is increased by increasing power to the turbine rotor.

14. A method as recited in claim 8, wherein the rotor rotation speed is decreased by reducing power to the turbine rotor, or by activating a dynamic brake.

* * * * *